United States Patent [19]
Steed et al.

[11] Patent Number: 6,151,065
[45] Date of Patent: Nov. 21, 2000

[54] CONCEALED INTEGRATED VEHICULAR CAMERA SAFETY SYSTEM

[76] Inventors: Van P. Steed, 3118 Corrina Dr., Rancho Palos Verdes, Calif. 90275; Scott J. Arnold, 1536 W. 25th St., Ste. 177, San Pedro, Calif. 90732; Robert K. Cejka, 18 Stirrup La., Rancho Palos Verdes, Calif. 90275

[21] Appl. No.: 08/492,672

[22] Filed: Jun. 20, 1995

[51] Int. Cl.[7] .................................................... H04N 7/18
[52] U.S. Cl. .......................................... 348/148; 348/151
[58] Field of Search .................................... 348/143, 148, 348/149, 151, 118; H04N 7/18

[56] References Cited

U.S. PATENT DOCUMENTS

| | | | |
|---|---|---|---|
| 4,665,430 | 5/1987 | Hiroyasu | 348/143 |
| 4,843,463 | 6/1989 | Michetti | 348/148 |
| 5,027,200 | 6/1991 | Petrossian | 348/148 |
| 5,121,200 | 6/1992 | Choi | 348/151 |
| 5,282,182 | 1/1994 | Kreuzer | 348/148 |
| 5,289,321 | 2/1994 | Secor | 348/149 |
| 5,319,394 | 6/1994 | Dukek | 348/148 |
| 5,523,811 | 6/1996 | Wada | 348/118 |
| 5,530,421 | 6/1996 | Marshall | 348/149 |

FOREIGN PATENT DOCUMENTS

| | | | |
|---|---|---|---|
| 600818-A1 | 8/1994 | European Pat. Off. | 348/148 |

*Primary Examiner*—Howard Britton
*Attorney, Agent, or Firm*—Lyon & Lyon LLP

[57] ABSTRACT

A concealed vehicular system is provided for a motor vehicle to permit the operator to view or record events occurring inside or outside the vehicle. A miniature camera is concealed within a functional component of the vehicle, such as within a rear-view mirror or a lighting device of the vehicle. The images from the video camera are stored in a recording device, such as a video camera recorder. Alternatively, the images produced by the video camera can be transmitted to a viewing screen, such as a cathode ray tube monitor or liquid crystal diode, within the view of the driver. The concealed video camera housed within a functional component of the vehicle is imperceptible to vandals and thieves, and does not distract from the aesthetics of the vehicle.

10 Claims, 7 Drawing Sheets

CONCEALED INTEGRATED VEHICULAR CAMERA SAFETY SYSTEM

BACKGROUND

There is a need for a vehicular viewing system that allows the recording and viewing of events occurring either outside the vehicle or inside the vehicle. Currently, the most popular viewing systems are mirrors, such as side view mirrors placed outside the vehicle or rear view mirrors placed diagonally above the driver.

Typically, the mirrors used in passenger, recreational, and commercial vehicles such as cars, vans and trucks provide a less than satisfactory means for viewing events occurring inside and outside the vehicle. For example, mirrors only allow the viewing of a limited area around the outside of the vehicle, and often leave blind spots such that the driver cannot see vehicles proximal and adjacent to the driver's car. The driver's lack of awareness of cars in the blind spots created by these mirrors increases the danger that the driver may steer his vehicle into an unseen adjacent car. Mirrors also distract the driver's attention by requiring adjustments so that the driver can increase the viewing area of the mirror. Further, during night driving, mirrors reflect into the driver's eyes the light from nearby vehicles, often causing night blindness. Side view mirrors additionally create wind drag, limiting the efficiency of the vehicle engine. These mirrors are also exposed and are easily damaged if the vehicle side swipes another object. Moreover, passengers and objects located within the vehicle can block the driver's mirror-assisted view of areas outside the vehicle.

Mirrors provide less than optimum vehicular security systems. For example, mirrors mounted on a truck do not give the truck driver an unobstructed view of the areas immediately adjacent the rear door of the truck. The driver thus may not be able to tell when unauthorized individuals approach the rear door to tamper with the truck. Mirrors on recreational vehicles likewise prove inadequate for occupants attempting to monitor suspicious activity outside the vehicles, especially when the vehicles are parked, e.g., at an RV campground or the like. Rear view mirrors in vehicles subject to public use, such as busses or taxicabs, only furnish partial views of the vehicle interior, and have no capability for recording or storing images of events which occur inside the vehicles.

Recently, a number of video camera systems have been suggested to alleviate some of the problems associated with mirrors. For example, the consolidated rear-view camera described in U.S. Pat. No. 5,289,321 attempts to solve this problem by placing cameras on the side of the vehicles in protruding fairing arrangements. The camera systems described prior to the present application tend to employ either large cameras or cameras that are somehow exposed or visible to passerby and to passengers. Such visible cameras are a lure for vandals and thieves, and are exposed to damage from collisions with objects outside the car. When placed outside the vehicle, such cameras can be stolen or damaged by passersby. Such cameras can also attract thieves looking to steal customized vehicles. When placed inside the vehicle, such cameras can cause passengers or customers of, say, taxi cabs, to feel uncomfortable or annoyed because of loss of privacy.

Additionally, conventional vehicular camera systems distract from the aesthetic appeal of the interior and exterior of the vehicle. Cameras which are visible from either the interior or the exterior of the vehicle or both give the impression of being added as an afterthought to the vehicle, rather than conveying the impression of being an integrated component of the vehicle.

In the recreational vehicle industry, video cameras may serve as a necessary safety feature. A video camera, mounted on the rear of a recreation vehicle with a small monitor placed inside the main cab of the vehicle, increases the driver's field of vision during recreational vehicle operation. Video cameras presently manufactured for recreational vehicles, however, are exposed to weather elements such as wind, rain, sleet, snow and dust, and, as is the case with other types of vehicles, are prime targets for theft and vandalism.

It is also desirable for truck drivers to see into blind spots as they make wide right turns or as they back the truck up. Conventional camera systems in trucks are exposed to passersby and attract vandals and thieves.

For the foregoing reasons, there is a need for a concealed vehicular camera system that can be integrated into traditional vehicle components, such as lights and mirrors, and that can inexpensively be manufactured and installed.

SUMMARY OF THE INVENTION

The present invention is directed to a device that satisfies the need for an inexpensive concealed vehicular camera system which can be integrated within traditional functional elements of the vehicle. The principle objects of the present invention are therefore to provide: a concealed safety camera system, a vehicle viewing system for viewing the area to the rear and side of a motor vehicle, and a concealed safety camera system for viewing or reading images of the inside of the vehicle.

A concealed vehicular camera system constructed according to the present invention comprises a video camera assembly including a miniature camera mounted within a housing that performs one or more additional vehicular functions. The video camera assembly is connected to a means for viewing and/or recording the images captured by the video camera assembly. The video camera assembly can be inexpensively and easily manufactured and installed. The means for viewing the images produced by the video camera assembly include a video screen (e.g., a cathode ray tube, a liquid crystal diode display, or the like) positioned within the viewing range of the driver. The means for recording the images produced by the video camera assembly include recording media capable of storing several hours of images produced by the video camera assembly. The means for recording and the recording media are remotely disposed and concealed within the vehicle.

As noted above, the camera housing of the present invention performs one or more additional functions, such as the function of a rear-view mirror, a tail light, a running light, a head beam, or a recreational vehicle reflector. In one preferred embodiment of the present invention, the video camera assembly is concealed in a vehicle running light housing for recreational vehicles, trucks, trailers and buses. The miniature camera is protected against debilitating factors by a protective enclosure which occupies minimal space and affords a secure attachment to said vehicles by virtue of a new mounting scheme that duplicates as a vehicle running light and concealed camera housing. In another preferred embodiment, the camera assembly is concealed in a rear-view mirror.

One advantage of the present invention is that it allows for the viewing of a greater area around and inside the vehicle than is permitted by conventional mirror systems. Another advantage of the present invention is that it is concealed and housed within a functional component of the vehicle and is thus invisible to passengers and passersby.

BRIEF DESCRIPTION OF THE DRAWINGS

These and other features, aspects and advantages of the present invention will become better understood with regard to the following description, appended claims, and accompanying drawings wherein:

BEST MODE FOR CARRYING OUT THE INVENTION

The video camera assembly used with the present invention includes a miniature camera such as a commercially available CCD camera coupled with means for providing power to the camera. The camera assembly further includes a means for transmitting the information collected by the miniature camera.

The concealed vehicular camera system employs a housing for the camera and either a viewing screen disposed within view of the driver, or a recording device having a recording media capable of storing several hours of visual images produced by the camera system, or both. The housing performs one or more additional vehicular functions besides protecting the camera, and can comprise, but is not limited to, a rear-view mirror, a side-view mirror, a tail light, a running light, a reflector or a head light.

Figure 1:
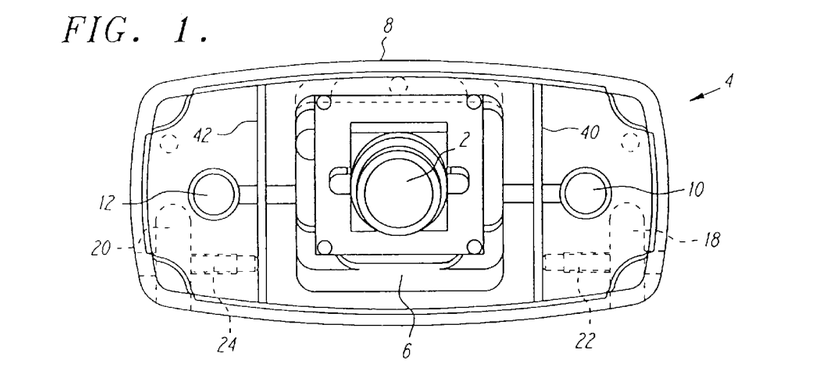
FIG. 1 is a top view of a camera assembly constructed in accordance with the present invention, mounted inside a vehicle running light.
Figure 2:
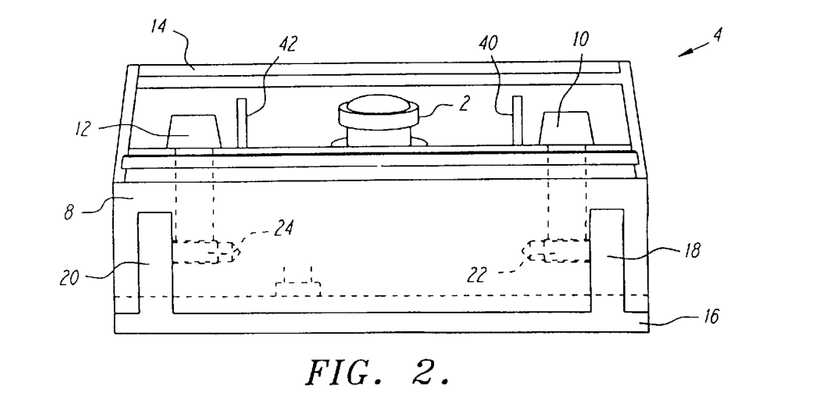
FIG. 2 is a front view of the camera assembly of FIG. 1.
Figure 3:
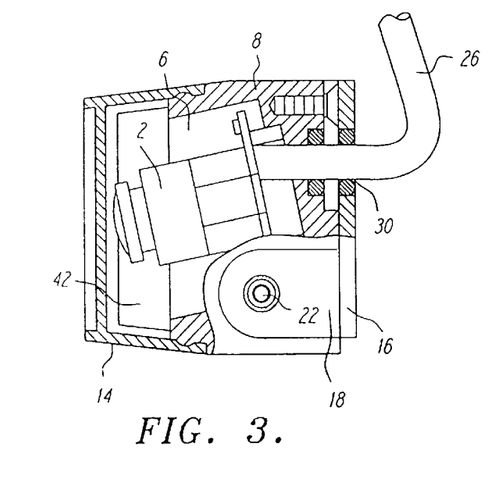
FIG. 3 is a side view of the camera assembly of FIG. 1.
Figure 4:
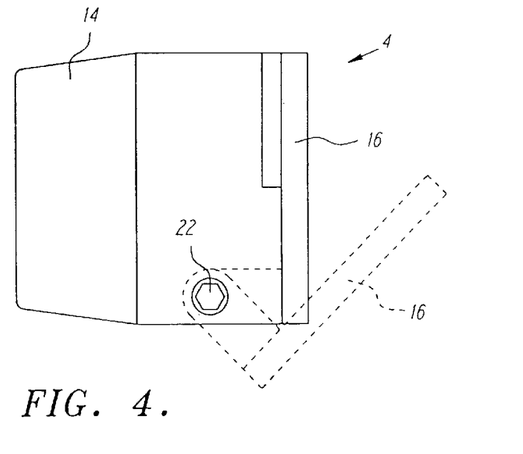
FIG. 4 is a side view of the camera assembly of FIG. 1, showing the running light housing with a rotatable bracket in an extended position.
Figure 5:
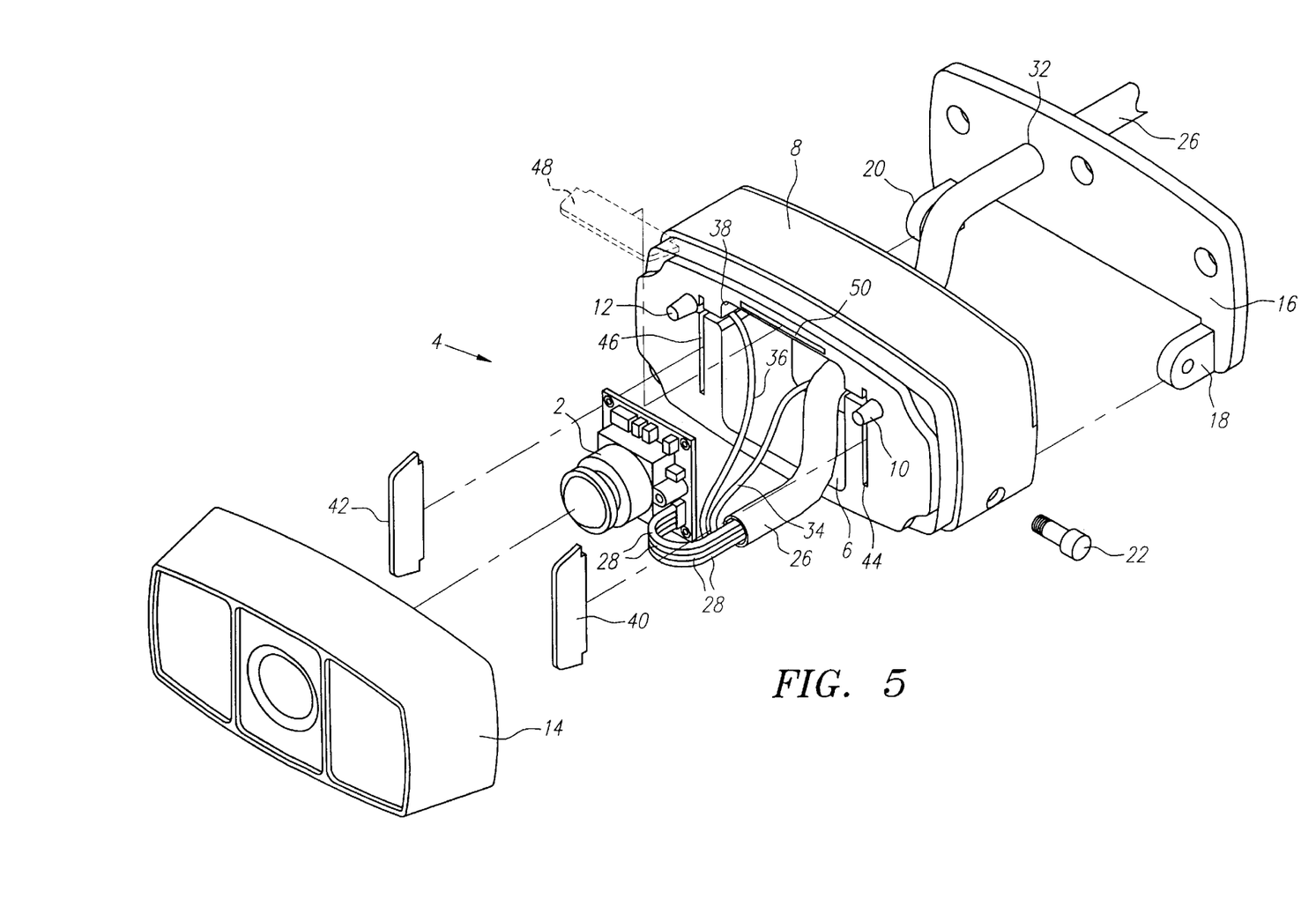
FIG. 5 is an exploded view of the camera assembly of FIGS. 1–4.

FIGS. 1–4 respectively illustrate top, front and right side views of a camera assembly concealed within a vehicle running light according to the teachings of the present invention. FIG. 5 is an exploded view of the camera assembly and running light system of FIGS. 1–4. The camera assembly includes a miniature camera 2 such as a commercially available CCD camera mounted inside a vehicle running light housing 4. The lens of camera 2 is preferably a 2.5 millimeter lens with a 90° angle. Minimum camera illumination is 0.03 lux, and the camera preferably runs on an 8 to 11 volt DC vehicle battery. Camera 2 is specifically positioned inside a cavity 6 formed in the base 8 of housing 4. If desired, a shock absorbing, cushioning material such as DELRIN™ can be used to surround camera 2 within cavity 6. Base 8 is formed from a solid material such as a high impact plastic. Light bulbs 10, 12, which are of the standard vehicular type obtained from a variety of automotive sources, are mounted on both sides of camera 2. A lens cover 14 is secured over the top of base 8, providing protection for both the camera and the light bulbs and concealment for the camera. Lens cover 14 is typically fabricated from plastic in accordance with applicable vehicular safety standards.

A rotatable bracket 16 can be used to secure base 8 of housing 4 to the side of a vehicle. Preferably, bracket 16 is formed with extensions 18, 20 which are attached via pins 22, 24 to both sides of the base. Thus, as seen the best advantage in FIG. 4, housing 4 can be rotated relative to the vehicle surface upon which base 8 is secured to provide different viewing angles for camera 2.

A video cable 26 connects camera 2 to a video monitor inside the vehicle (not shown in FIGS. 1–4). Cable 26 is a conventional video component containing power, ground and video lines 28 capable of supplying power to the camera and carrying video signals to the monitor. The details of the connections between camera 2 and the video monitor are well understood by those of ordinary skill in the art. Cable 26 passes through an opening 30 in the back of base 8 and a similar opening 32 in bracket 16 to the interior of the vehicle. If desired, electrical conductors 34, 36 carrying electrical current from the vehicle power supply to operate light bulbs 10, 12 can also be placed inside cable 26. If further desired, a small cut-out 38 can be formed in the side of cavity 6 of base 8 to provide room for cable 24 when camera 2 is mounted inside the cavity.

In order to prevent light emitted by light bulbs 10, 12 from interfering with the operation of camera 2, partitions 40, 42 are placed on both sides of the camera inside the lens cover 14. Partitions 40, 42, which may be fabricated from a heat resistant material, e.g., aluminum or a non-heat deformable plastic, fit in slots 44, 46 formed in base 8 of housing 4. Whenever light bulbs 10, 12 are operational, the partitions 40, 42 screen light from the lens of camera 2. A third partition 48, shown in phantom in FIG. 5, may optionally be placed in a slot 50 above camera 2 to serve as a heat shield. A similar partition (not shown) can optionally be placed below camera 2 inside lens cover 14 for the same purpose.

Figure 6:
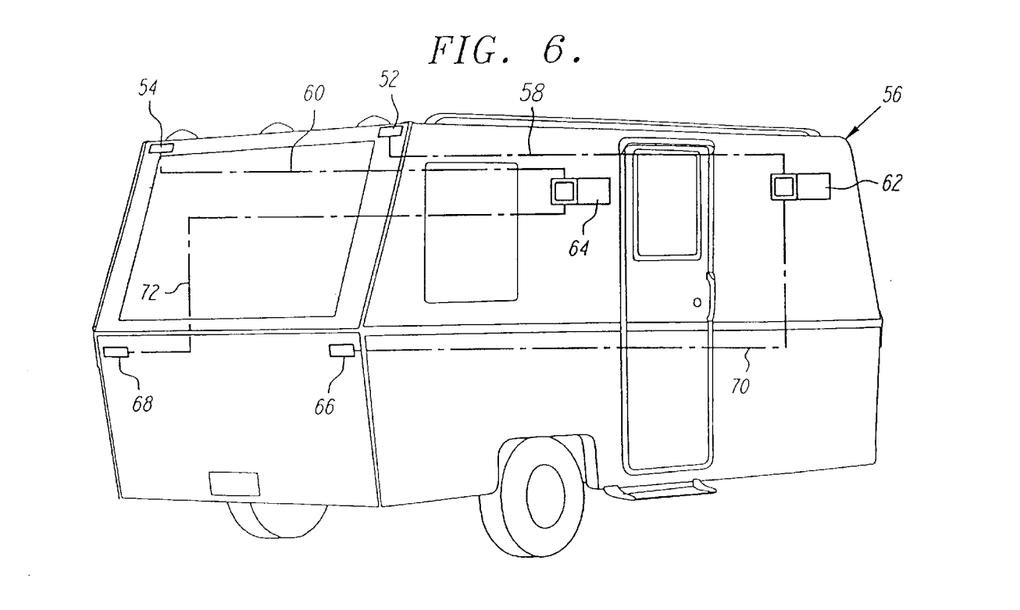
FIG. 6 is a perspective view of the present invention mounted on a recreational vehicle in two alternative positions.

Turning to FIG. 6, a pair of running lights 52, 54 containing camera assemblies constructed in accordance with the teachings of FIGS. 1–5 can be seen mounted along the top rear surface of a vehicle 56. Vehicle 56 could be a recreational vehicle, as illustrated in FIG. 6. Alternately, vehicle 56 could be a truck, trailer, or automobile. It is understood by those of ordinary skill in the art that any vehicle could successfully employ the present invention. A pair of cables 58, 60 from the cameras in running lights 52, 54 are connected in conventional fashion to a pair of video monitors 62, 64 inside the vehicle. Alternately, as described further below, the cameras in running lights 52, 54 could be connected to a single video monitor through a switching circuit which selects for display the video images from either the camera in the right-hand running light 52 or the left-hand running light 54.

The concealed camera system of the present invention is not, of course, restricted to running lights. In an alternative embodiment of the present invention, a camera assembly could be placed in the vehicle brake lights 66, 68 and connected via cables 70, 72 to monitors 62, 64. Indeed, the teachings of the present invention can be applied to almost any vehicular lighting component, as long as provisions are made to conceal the camera behind the light lens and screen the camera lens from the light bulbs in the lighting component.

As can be seen from FIG. 6, the images produced by the video camera arrangement concealed within the running lights or tail lights of vehicle 56 are transmitted to a video monitor within the view of the vehicle driver. This allows the driver to see in "real-time" the events occurring to the rear of the vehicle without suffering the difficulties inherent in using the rear-view and side-view mirrors, which often produce blind spots and reflect blinding light from other vehicles into the driver's eyes.

Another advantage of the present invention, apparent from FIG. 6, is that the aesthetics of the vehicle are not disturbed by the presence of an ungainly visible video camera system. An additional advantage of the present invention is that the video camera arrangement is concealed such that thieves and vandals are not lured to the vehicle. Still another advantage of the present invention is that it is easy and inexpensive to manufacture and install within the vehicle.

Figure 7:
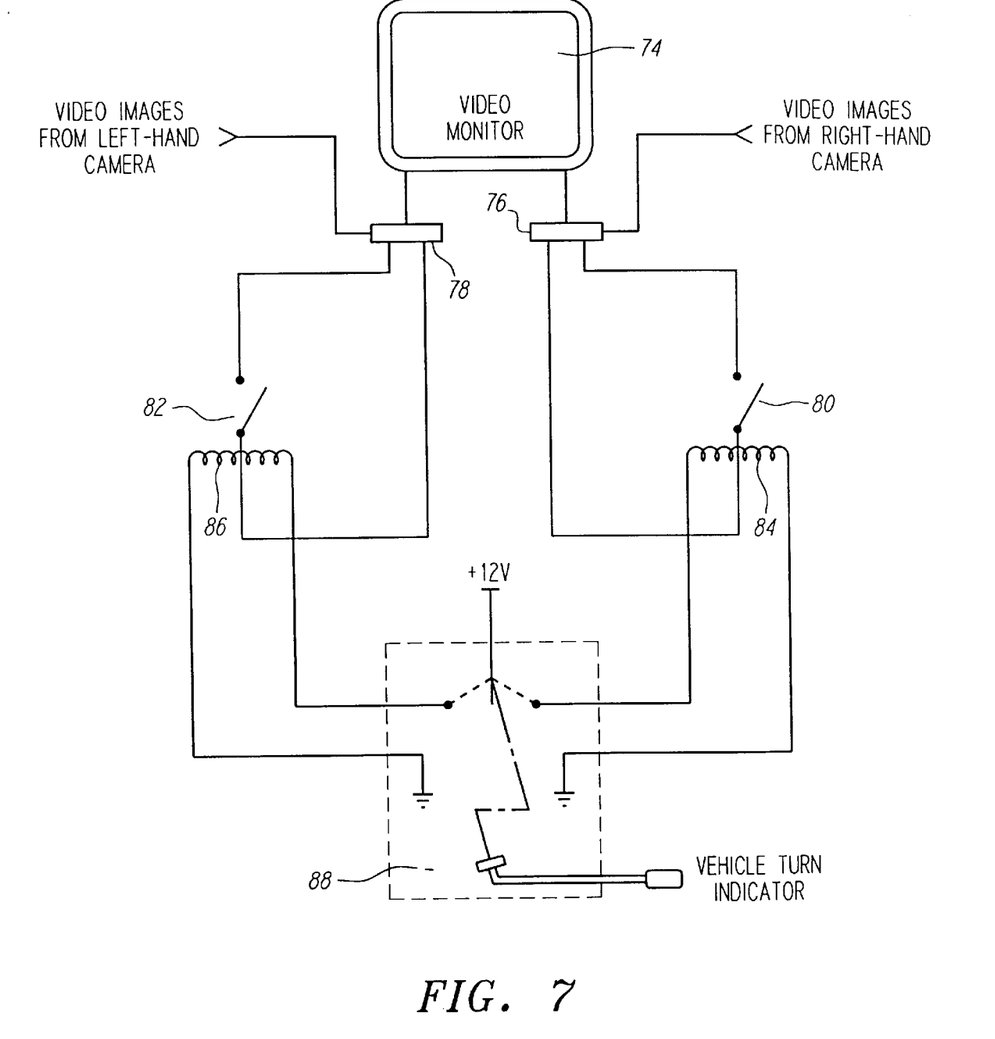
FIG. 7 is schematic diagram of an electrical circuit adapted for use with the present invention.

FIG. 7 depicts a simple circuit for switching video images from a right-hand concealed camera to a left-hand concealed camera as a function of the position of the vehicle turn indicator. A video monitor positioned inside a vehicle (not shown) in clear view of the vehicle driver is shown at 74. Circuits 76 and 78 respectively control the transmission of video images from the right-hand concealed camera, e.g., the camera in running light 52 of FIG. 6, and the left-hand concealed camera, e.g., the camera in running light 54 of FIG. 6, to the video monitor. Circuits 76 and 78 can comprise any known structure, e.g., switches (not shown), through which the video images from the right-hand concealed camera and left-hand concealed camera reach video monitor 74 when circuits 76 and 78 are energized. A pair of switches 80, 82 operated by relays 84, 86 are positioned in circuits 76 and 78 such that closure of switch 80 provides video monitor 74 with video images from the right-hand concealed camera while closure of switch 82 provides the video monitor with images from the left-hand concealed camera. Relays 84, 86 are in turn connected to the vehicle turn indicator 88 via a simple electro-mechanical arrangement constructed as those of ordinary skill in the art would understand. The turn indicator 88 alternately completes a circuit between ground, relay coil 84 and the vehicle power supply (+12 volts DC) or ground, relay coil 86 and vehicle power supply.

When the driver of the vehicle moves the turn indicator mechanism 88 to indicate a right-hand turn, relay 84 is connected to the vehicle power supply, causing switch 80 to close and direct video images from the right-hand concealed camera to video monitor 74. Conversely, when the vehicle turn indicator 88 is moved by the driver to the left-hand turn indicating position, relay coil 86 is connected to the vehicle power supply, causing switch 82 to close and direct video images from the left-hand concealed camera to video monitor 74. In this manner, the driver of a vehicle equipped with a concealed camera assembly of the present invention can obtain rear-view video images correlated to the direction in which the driver is turning the vehicle.

Figure 8:
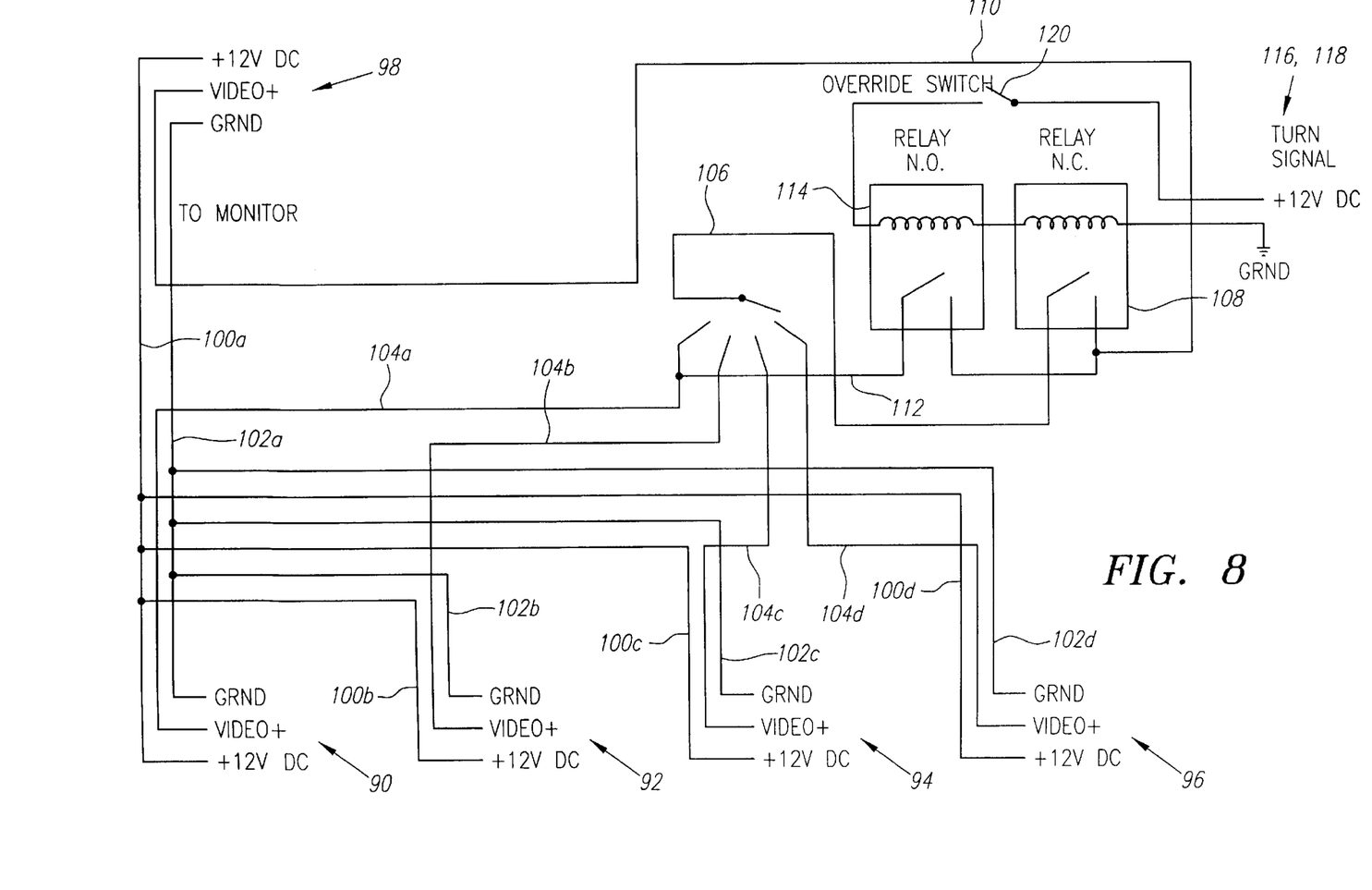
FIG. 8 is a schematic diagram of an alternative electrical circuit for use with the present invention.

A somewhat more complicated circuit arrangement for a four-camera configuration of the present invention is shown in FIG. 8, together with an automatic right-turn video actuator. The four cameras include a right-turn camera, indicated at 90, and three additional cameras 92, 94, 96 mounted in additional desired locations along the side and/or rear of the vehicle. Each of the cameras 90–96 is connected to a video monitor 98 mounted in the vehicle via a power line 100a–100d and a ground line 102a–102d. Video lines 104a–104d are connected through a rotary switch 106 and relay 108 to a common video lead 110 and thence to video monitor 98. An automatic right-turn video actuator including right-turn override circuit lead 112 and relay 114 is also connected to common video lead 110. Both relays 108 and 114 are powered by the vehicle power supply through an electro-mechanical switch 116 actuated by the vehicle right-turn indicator 118.

Relay 108 is normally in the "CLOSED" position during power-off conditions, whereas relay 114 is normally in the "OPEN" position during power-off conditions. Thus, the video image received by monitor 98 when the right-turn indicator is not activated depends upon the setting of rotary switch 106. Monitor 98 can receive images from any of the cameras 90–96. However, when the driver of the vehicle activates the right-turn signal indicator 118, power is supplied to relay 114 and 108, switching relay 114 to the "CLOSED" position to connect video line 104a through override circuit lead 112 and relay 114 to common video lead 110. Relay 108 simultaneously switches to the "OPEN" position to disconnect rotary switch 106 from common video lead 110. The rotary switch 106 is effectively overridden and images from the right-turn camera 90 are received at monitor 98 regardless of the setting of rotary switch 106. When the driver has completed the right-hand turn, the right-turn signal indicator 118 returns to its inactive position, removing power from relays 114 and 108. Relay 114 opens to disconnect override circuit lead 112 from common video lead 110, while relay 108 closes, returning control of the camera images received by camera 98 to rotary switch 106. If desired, a manual override switch 120 can be provided in series with relays 108, 114 to override the automatic right-turn video actuator.

Another way in which the present invention is used is by recording events, vehicles, and other objects to the rear of the vehicle by concealing the video camera arrangement within a tail light of the vehicle. The images of the recorded events are then stored within a recording media disposed remotely within the vehicle, for example, disposed in the trunk of the vehicle. This embodiment of the invention allows the driver to record events that occur to the rear of the vehicle.

Figure 9A:
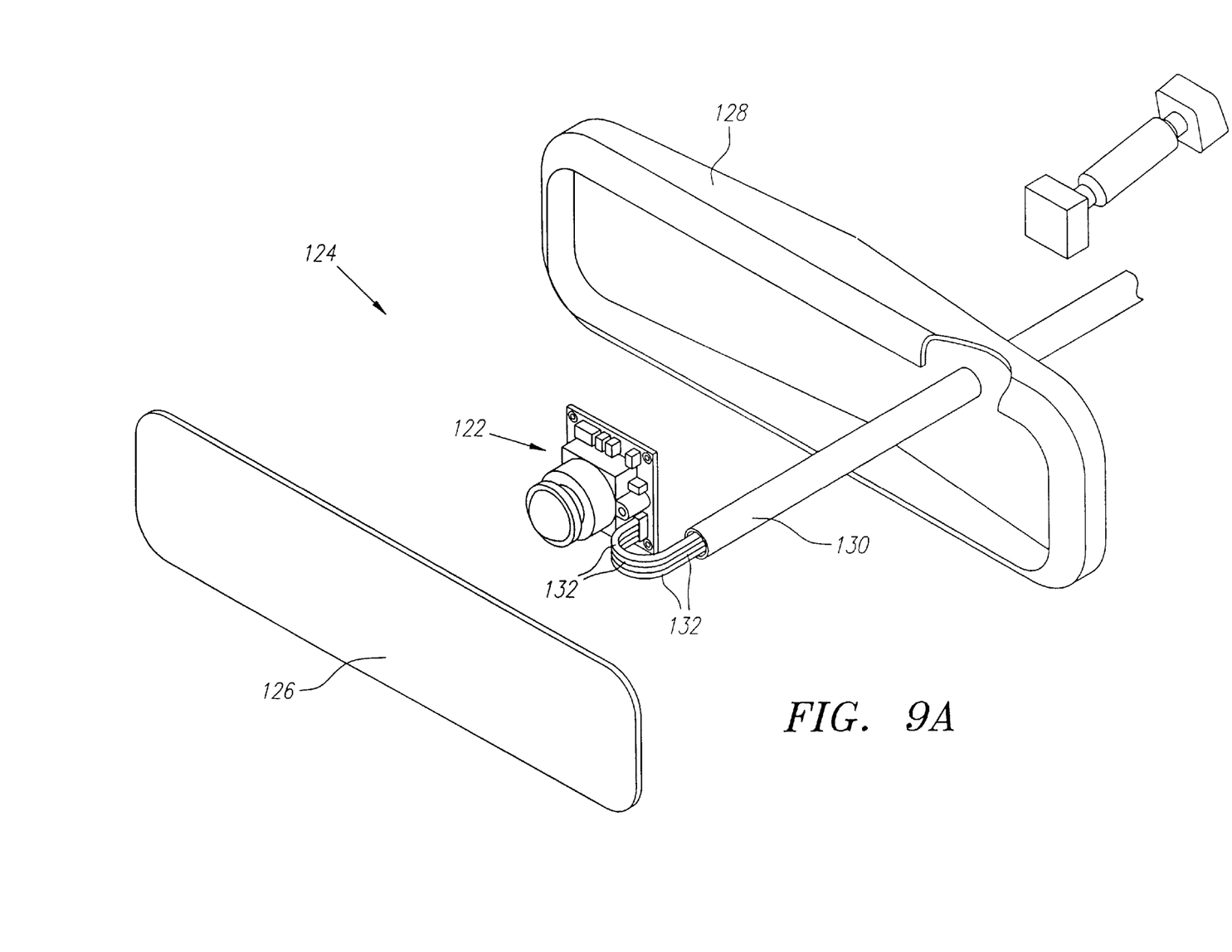
FIG. 9A is an exploded view of the rear view mirror embodiment of the present invention.
Figure 9B:
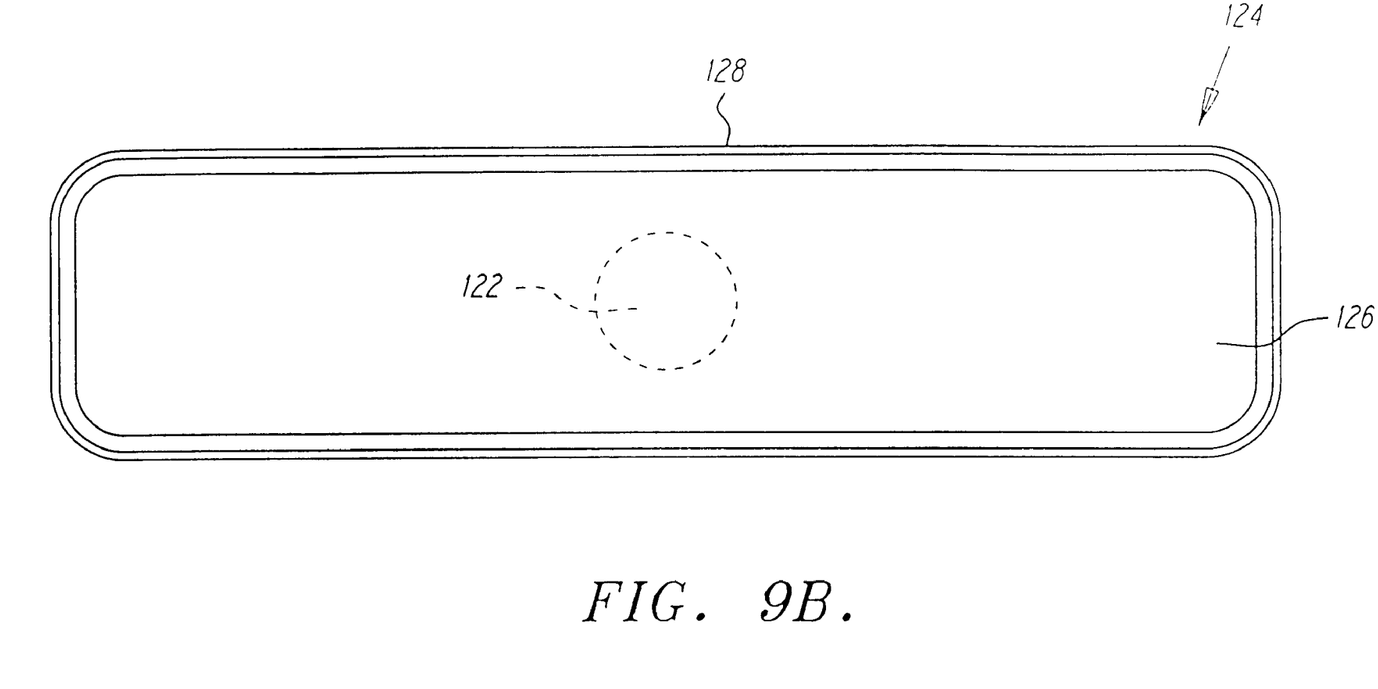
FIG. 9B depicts the rear view mirror-mounted version of the present invention in an assembled condition.

FIGS. 9A and 9B illustrate a different mounting technique for a concealed camera constructed in accordance with the present invention, wherein the camera 122 is concealed inside the rear-view mirror assembly 124 on the vehicle. Rear-view mirror assembly 124 includes a two-way mirror 126 secured to a rear-view mirror frame 128. A cable 130 enclosing power, ground and video lines 132 supplies operating power to camera 122 and transmits video images from the camera to a video monitor (not shown in FIGS. 9A–9B) inside the vehicle.

Figure 10:
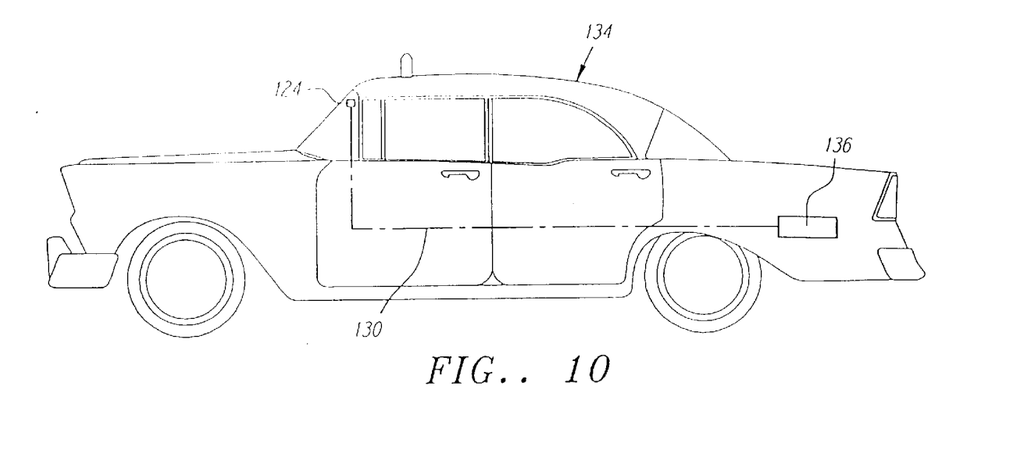
FIG. 10 is a view of the rear-view mirror embodiment of the present invention mounted in a vehicle.

Turning to FIG. 10, rear-view mirror assembly 124 containing a concealed camera assembly constructed in accordance with the teachings of the present invention is mounted in vehicle 134 at the conventional rear-view mirror position. Cable 130 carrying the power, ground and video lines is connected to a conventional video recording device 136 also mounted in a concealed location such as the trunk of the vehicle. Video recording device 136 records the images provided by the concealed camera in the rear-view mirror assembly 124. The concealed camera and video recording system can be activated by the driver of the vehicle, using a simple switch mechanism (not shown) mounted on the vehicle dash board, as would be well-understood by those of ordinary skill in the art. If desired, infrared lights or the like (not shown) can be placed inside the rear-view mirror assembly 124, behind two-way mirror 126, to enhance the imaging ability of camera 122 under low-light conditions.

Use of a concealed camera and video recording system as shown in FIG. 10 provides an added measure of security for vehicles such as taxi cabs and busses. Video images generated by the concealed camera in rear-view mirror assembly 124 can be stored in video recording device 136 to create a permanent video record of the occupants in the vehicle. The taxi cab or bus driver simply activates the concealed camera and video recording system to obtain a permanent video record of the occupants in the vehicle. This a permanent video record can prove of great assistance to law enforcement officers and the like in the event of a crime occurring in the vehicle. Knowledge on the part of would-be criminals that a vehicle is equipped with a concealed camera and video recording system may also act as a deterrent to criminal activity involving the vehicle.

Another advantage of this embodiment is to make such permanent recordings of the events within the commercial vehicle without causing the passengers to feel uncomfortable or watched by a visible camera system.

Although the present invention has been described in considerable detail with reference to certain preferred versions thereof, other versions are possible. Therefore the spirit and scope of the appended claims should not be limited to the description of the preferred embodiments contained herein.

What is claimed is:

1. A concealed vehicular camera system that permits viewing or recording of events while simultaneously performing a vehicle lighting function, said concealed vehicular camera system comprising:

a video camera assembly including a miniature video camera;

at least one light source which emits light during vehicular operation;

a housing structure including a cavity shaped to receive both said miniature video camera and said light source;

a cover disposed over said cavity of said housing structure and fabricated from a transparent material through which light and visual images can pass, said cover serving to conceal said miniature video camera inside said cavity; and a partitioning structure placed in said cavity of said housing structure and positioned to shield said miniature video camera from said light source in order to prevent light emitted by said light source from interfering with the operation of said miniature video camera.

2. A concealed vehicular camera system as set forth in claim 1, further including at least one viewing screen coupled to said miniature video camera and positioned within the viewing range of the vehicle driver.

3. The concealed vehicular camera system of claim 1 further comprising a heat filter mounted within said housing and above said miniature video camera.

4. The concealed vehicular camera system of claim 1 wherein said lighting device is a running light.

5. The concealed vehicular camera system of claim 1 wherein said lighting device is a brake light.

6. The concealed vehicular camera system of claim 1 wherein said miniature video camera comprises a CCD camera.

7. A concealed vehicular camera system as set forth in claim 1, wherein said cover disposed over said cavity of said housing structure is a lens.

8. A concealed vehicular camera system as set forth in claim 1, wherein said light source consists of a plurality of vehicular light bulbs, said miniature video camera is positioned in said cavity of said housing structure between two of said light bulbs, and said partitioning structure includes a first partition positioned between said miniature video camera and the first of said two light bulbs and a second partition positioned between said miniature video camera and the second of said two light bulbs.

9. The concealed vehicular camera system of claim 1, further including a recording device for storing the video images produced by said miniature video camera.

10. The concealed vehicular camera system of claim 9 wherein said recording device is a video recorder which records images on a video tape.

* * * * *